United States Patent
Prendergast et al.

[19]

[11] Patent Number: 5,842,148
[45] Date of Patent: Nov. 24, 1998

[54] METHOD OF EVALUATING AND CLASSIFYING LIVING STRUCTURES FOR ESTIMATING POTENTIAL DAMAGE THERETO FROM PHYSICAL DISTURBANCES

[75] Inventors: James C. Prendergast, Saratoga; Leslie N. Ransbottom, Redwood City; Walter E. Dibble, Palo Alto, all of Calif.

[73] Assignee: JCP Geologists, Inc., Cupertino, Calif.

[21] Appl. No.: 726,693

[22] Filed: Oct. 7, 1996

[51] Int. Cl.$^6$ .................................................. G01L 1/26
[52] U.S. Cl. ............................................ 702/34; 702/42
[58] Field of Search .................................. 364/506, 508; 73/769, 786, 800, 570, 584, 594, 760, 806; 702/14, 42, 34; 701/29; 340/438; 705/4

[56] References Cited

U.S. PATENT DOCUMENTS

| | | | |
|---|---|---|---|
| 4,409,842 | 10/1983 | Scott et al. | 73/800 |
| 4,433,581 | 2/1984 | Scott et al. | 73/786 |
| 4,480,480 | 11/1984 | Scott et al. | 73/769 |
| 5,195,046 | 3/1993 | Gerardi et al. | 364/506 |

*Primary Examiner*—James P. Trammell
*Assistant Examiner*—Matthew Smithers
*Attorney, Agent, or Firm*—J. Nicholas Gross

[57] ABSTRACT

Residential wood home structures are evaluated and classified according to a defined risk level relative to damage likely to be caused by earthquake shaking or wind forces. Susceptibility to damage is evaluated and predicted by a probabilistic software engine based on existing databases of geologic and/or wind data coupled with specific structural characteristics information obtained by an onsite inspection of the structure. The software engine combines these data sets, and produces a report with a reliable, quantified risk rating that can be used by insurance companies to make decisions regarding offering of insurance and rates of insurance. The report is also used by homeowners as an evaluation factor in deciding to strengthen the structure against earthquake and/or wind storm damage. Because of its high volume capability and affordability, this inventive process makes assessment of a home's risk relative to damage induced by earthquake shaking and/or wind forces available to a larger segment of the general market, including home owning and home buying persons.

54 Claims, 1 Drawing Sheet

METHOD OF EVALUATING AND CLASSIFYING LIVING STRUCTURES FOR ESTIMATING POTENTIAL DAMAGE THERETO FROM PHYSICAL DISTURBANCES

FIELD OF THE INVENTION

The present invention relates to methods for estimating risk of damage that is likely to be sustained by a structure from a physical disturbance. Specifically, the present invention provides a method for inspecting and determining the structural integrity of wood frame residential structures relative to earthquake shaking and wind forces acting upon such structures, and for quantifying the potential risk of such structure sustaining damages from such forces.

BACKGROUND OF THE INVENTION

Wood frame structures (especially those used for residential purposes) have long sustained significant amounts of damage due to physical disturbances accompanying "natural disasters" such as earthquakes and wind forces (hurricanes, tornadoes, nor'easters etc.). Due to the frequency of such events and the amount of damage which they can inflict on residential communities, damage risk assessment is an important consideration and priority for homeowners, lending, insurance and real estate industries, damage relief organizations and governmental agencies. Accurate prediction of such natural disasters has proven to be ineffective in most cases.

This leaves the burden of damage risk assessment to an analysis of the structural condition of a given home and how the structure would react to the varying stresses from physical disturbances experienced during earthquake shaking and high wind events. To date, such risk assessments have been made in two ways: (1) solely based on a subjective, onsite inspection analysis; or (2) solely based on a group "aggregate" comparison and evaluation of similar homes in the general geographic location as the structure in question.

In the first approach, engineers, architects and other technical specialists consider each home as an individual "project." Due to the fact that the specialist employed usually deals with a small number of exhaustive analyses, the time it takes for a risk assessment is great, ranging from weeks to months. Furthermore, due to the time and character of the report produced, this style of risk assessment can cost on the order of thousands of dollars. An onsite inspection by a technical specialist with a subsequent report and analysis is thus a process which is cost prohibitive for the average home owner or buyer. It also is a process which is not conducive to mass production, as each technical specialist works on a case by case basis, usually doing every part of the assessment themselves. In addition, conflicting standards used by such specialists in performing their inspections and analyses often results in inconsistent and unreliable data and conclusions that are difficult to interpret and of uncertain value to the entities listed above. Furthermore, such specialists have not been known to use (or have the facilities to use) geologic data and wind data specific to the site of the structure (such as the frequency, intensity, and proximity of earthquake faults), and thus are not able to consider this crucial element of the risk assessment process.

The second approach above can be seen to be even more unreliable and unusable, since it does not even include a direct observation of the specific characteristics of the structure in question.

SUMMARY OF THE INVENTION

Accordingly, it is an objective of this invention to provide a method for accurately and reliably classifying wood frame structures (such as residential homes) for purposes of defining the potential risk level and damage that may be caused by physical disturbances, such as may be caused by earthquake or wind forces. As used herein, "physical disturbances" generally refers to seismic, wind, flood, tornado and other similar forces which might have a deleterious effect on the physical integrity of a wood frame structure.

A further objective of this invention is to provide a method of home risk analysis which can be inexpensively performed and thus made available to a larger number of potential users.

It is another objective of this invention to provide a useful diagnostic process for inspecting and evaluating wood frame structures that can be used to detect significant flaws in such structures, and for recommending corrections to such structures to reduce risk of damage from occurrences of the aforementioned physical disturbances.

The above objectives are accomplished by the method of the present invention, which estimates risk of damage likely to be sustained by a wood frame structure located at a particular site from a physical disturbance such as a wind storm or earthquake. The method generally includes the following steps: first, an inspection is made onsite to determine and collect structural characteristics data of the structure's frame and related physical data. This data is input into a database usable by a probabilistic engine computer program. This program generates an estimate of the risk of damage to the structure, based on a combination of the structure data and wind storm or earthquake database related information for the area where the structure is located.

The structural characteristics data collected can include data relating to the structure's frame, openings, supporting walls, foundation, cripple wall, roof and "soft" stories. Building code data and empirical damage historical data for such structure is also incorporated to refine the risk estimate.

An earthquake force specific risk report can be generated based on the structural characteristics data, and available seismic database information such as USQUAKE, which takes into consideration earthquake information related to the vicinity of the structure, such as probable type and size, recurrences and other geologic conditions. Similarly, a wind force specific risk assessment report can be generated based on the structural characteristics data, and available wind force database information such as USWIND, which takes into consideration information such as probable type and size of storms in the vicinity of the site.

The resulting report includes an overall rating for such structure that can be used for actuarial purposes. Additional information on defects detected in the structure, and recommendations for curing such defects is also included. The prediction or rating is also used by a homeowner as an evaluation factor in his/her decision to strengthen the structure against earthquake and/or wind storm damage. Government agencies and other entities can also utilize the risk assessment and information for many other uses such as but not limited to: disaster relief decisions, emergency planning, population displacement planning, etc.

By using a standard, uniform set of structural characteristics and available seismic and wind force database technology, the present invention permits inexpensive risk assessment that can be made more widely available to a larger percentage of the population. Further unlike prior art methods, the present report and rating can be generated within days of an onsite inspection. These factors make the present risk assessment process significantly more affordable in cost than a specially hired engineer, architect or other technical specialist.

DETAILED DESCRIPTION OF THE INVENTION

Figure 1:
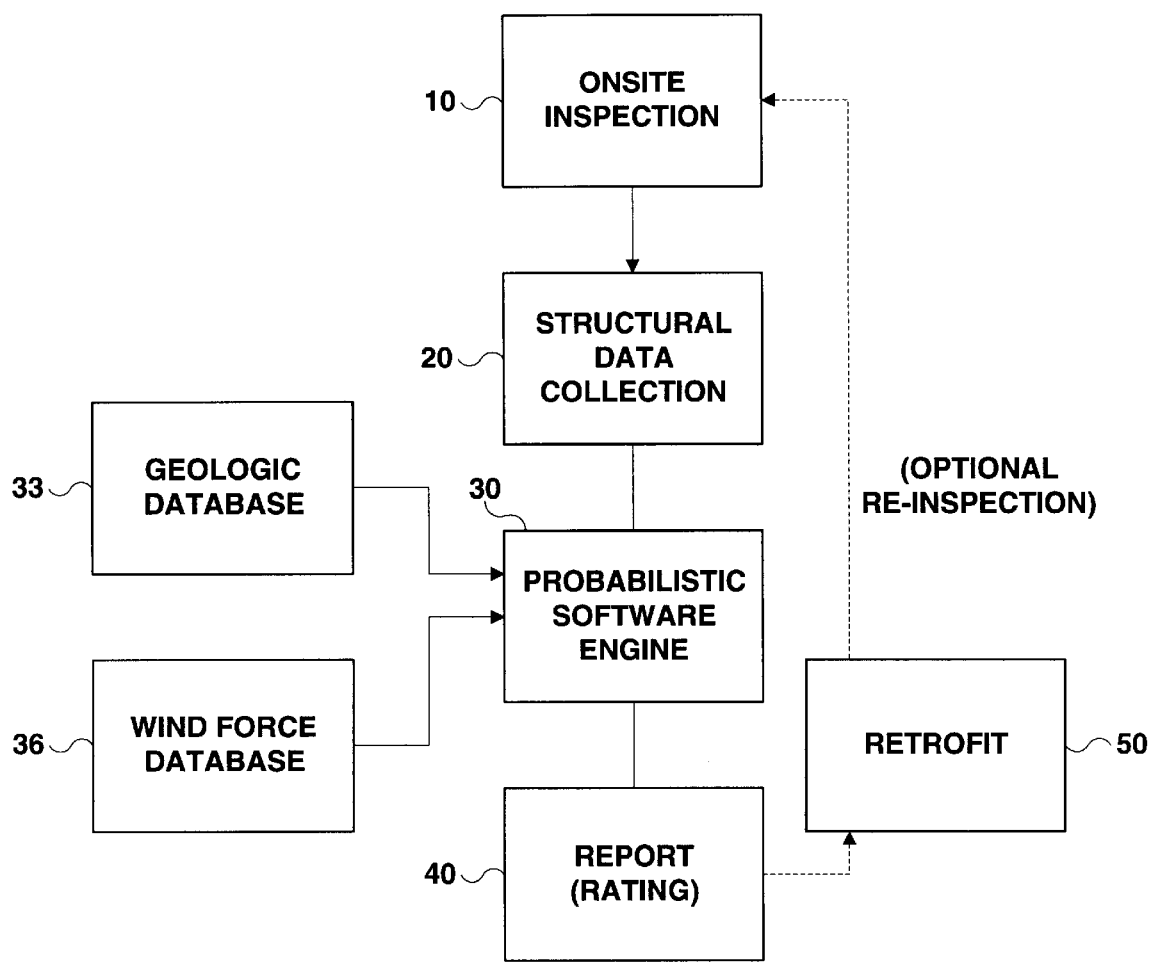
FIG. 1 is a flow diagram generally depicting steps employed in the method of the present invention.

Single family wood frame homes are the most prevalent construction type in North America and other locations around the world. Windstorms, earthquake shaking and flooding are the most common natural hazards that damage and cause destruction to such structures. Earthquake shaking and windstorms are similar in nature relative to how they cause damage to wood frame structures. A structure is shaken and stressed by both of these natural events. A high percentage of damage that occurs to wood frame structures during shaking events is due to common design and construction flaws. By identifying these critical design aspects and assessing types of stress inducing events a structure may experience (such as may be obtained from available earthquake and wind databases), a reliable, inexpensive and quantified risk determination can be obtained. This risk determination can be converted into a standardized "rating" that can be used by homeowners, insurance companies, etc.

The risk evaluation method of the present invention is depicted generally by the flow diagram of FIG. 1.

A wood frame structure first undergoes an onsite inspection 10 to detect defects and flaws. The onsite inspection is preferably done by a person trained and qualified to detect structural and construction defects. While a professional inspector is preferred in order to increase the accuracy of the inspection, any person who has significant practical field experience in examining various aspects of home structure and design aspects (and who can collect sufficient information for a risk evaluation program described below) can perform onsite inspection 10.

Structural characteristics data 20 and other related data for the structure are collected and compiled by an inspector or other suitably trained person. A standardized set of parameters and information is collected in all cases to promote uniformity and reliability. In general, structural characteristics data 20 collected is based on knowledge and information provided by structural engineers of ordinary skill in the art, and includes provisions for ascertaining characteristics of structures important in evaluating their probable performance when stressed by natural forces such as earthquake shaking and wind storms. Structural data considered by home inspection business practitioners and others skilled in this art to be important to risk assessment evaluations is also preferably collected.

The structural characteristics data collected primarily includes data pertaining to typically weak elements of wood frame structures that are known (i.e., such as from standard design/modelling information, or empirical analyses of earthquake and storm damage to such structures) to be critical elements associated with damage. As is apparent, the information collected below is specific to wood frame structures. It will be evident to those skilled in the art, however, that the present invention could be applied in a similar manner to structures constructed of masonry, adobe, concrete block, or other such materials.

In a preferred embodiment, the present invention is used to analyze structures up to three stories in height, and less than 5000 square feet. On a broad level, information concerning general design characteristics of the wood frame structure are collected, including such things as building height (number of stories), approximate size of living space (square feet), general dimensions, including total length of front-facing walls, and total length of left or right facing walls. Primary exterior finishes are also determined, as well as obvious major defects in structural framing, bracing or foundation systems (e.g., dry-rot, deterioration, critical corrosion) as might be observed in any bracing system, the existence and prevalence of wood studs and sill plates (or their nailing and anchors), floor joist and beam systems, and perimeter foundation concrete defects. General architecture features (i.e., ceiling heights, room proportions, etc.) are also examined, along with the vertical configuration of the structure (i.e, whether exterior walls extend to the foundation). In addition, building plan layouts, slope of building pads, the existence and nature of any chimneys, and roofing information (roof materials, number of layers, roof decking materials) are also considered.

More specific information on walls of the structure is also collected, such as total wall length that is uninterrupted by doors, windows or other openings for each floor, and relative strengths of walls on any particular floor. This aspect of design is one which has been regularly recognized by those skilled in the art as a critical element of design relative to earthquake-induced shaking damage. It is advantageous to determine not only the length of walls, but the relative strength which they lend to the structure as a whole. For example, a solid wall is regarded as "stronger" than a wall which is interrupted by a large sliding glass door.

Specific details of foundation materials and anchorage are also inspected and collected, including perimeter foundation type, type of anchorage to the foundation, and age, size and spacings of anchor bolts or other anchoring mechanism. Again, this is an aspect of design which is empirically associated with damage sustained by earthquake shaking. If a structure is on a sub-standard foundation, such as an old brick foundation, damage can be experienced if the foundation fails. More commonly, if the structure is not properly anchored to the foundation, damage can be sustained during earthquake shaking if the structure is shaken off (or wind-lifted off) its foundation.

The most common design aspect associated with earthquake shaking, cripple wall design, is also examined. A cripple wall is a wall which connects the house structure to the foundation and elevates it to provide a crawl space beneath the house. If a cripple wall is weak, not properly braced, or braced with weak materials and/or incorrect fastenings, there is an empirically proven high rate of damage to the structure from earthquake forces. The cripple wall is susceptible to failure due to a high amount of shear stress exerted upon it during earthquake shaking. Failure of the cripple wall causes the structure to "fall" off the foundation and often experience further damage due to bouncing, distortion and impact. Thus, information is also collected concerning the cripple wall (existence, type, coverage, age) and related structures (perimeter cripple-wall studs, diagonal braces, exterior and interior bracing panel size, distribution and coverage, hold-downs & fasteners (and defects)). Furthermore, the quality of any bracing, including whether panels are fully nailed and supported at all edges, and nail spacing is noted. Framing clips in cripple-wall or rim joist systems are also examined.

Finally, the onsite inspection also evaluates the possible existence of "soft stories," a living area which is located above incomplete or structurally inadequate support walls. This typically refers to a living area over a garage. A garage door wall, due to the fact of the large interruption represented by the door, is not typically an adequate support wall. Thus, information concerning whether the garage is attached to the primary structure, whether there is a living space over garage, the number of side-by-side parking spaces in any garage, and total length of solid wall in line with any garage door opening is also collected.

The year of original construction of the structure is also ascertained, and from this, applicable building codes associated with the structure can be determined. Such codes also can be correlated in some instances to empirical rates of damage in earthquakes or storms for homes of similar age.

These are but examples of what information can be collected, and it will be apparent to those skilled in the art that additional or lesser data can be used as needed or desired. For an inspection designed to evaluate risk of wind damage, for example, appropriate structural information relating to wind forces would be collected. In addition to the above list, for example, this could include information on windows (size and location) and roofs (type, overhangs and shape).

After the structure is inspected, and the structural characteristics data 20 is collected, this information is input to a risk evaluation program at step 30 for analysis. In a preferred embodiment, the information is digitized and entered into a GIS (Geographic Information Systems) database containing a probabilistic program that has been specifically designed to evaluate and determine the relative risk of a given structure, specific to its location and other factors, when subjected to shaking and stresses of earthquake shaking or wind forces, as indicated by databases for geologic data 33 and wind data 36 respectively. In a preferred embodiment, the specific databases used by program 30 include USQUAKE and USWIND. USQUAKE and USWIND are both available database-probabilistic-software engine programs designed by EQE International of San Francisco, Calif. The above programs are examples of a type of database related software that is becoming more and more useful to insurance and reinsurance industries to evaluate portfolios of insurance policies for actuarial purposes. In addition, lenders of all types are starting to utilize this type of database and related software in their loss reduction and risk analysis efforts.

USQUAKE, and similar database-probabilistic-programs contain GIS databases, normal type databases and sophisticated engineering analyses which can evaluate a number of parameters in determining the relative risk of damage to a structure. In a preferred embodiment of the present invention, such programs are used to consider such parameters as: [1] distance to earthquake faults; [2] probable type and size of earthquakes; [3] earthquake recurrence intervals; [4] building code that the structure was built under; [5] type of construction used; [6] geology of area where the structure is located; and [7] empirical damage rates. Thus, such databases can include geologic, geographic, demographic and regulatory information. Similar types of information are utilized for a wind related analysis.

The above parameters are considered because (correlating to the above): [1] It is generally accepted that earthquake shaking intensity decreases with distance from the causative fault. Since most faults rupture along a line (linearly) it follows that the perpendicular distance from the causative fault is a prime factor in damage analyses; [2] Although the magnitude or size of an earthquake is of paramount importance to the amount of damage it can cause, it is also very important what type of earthquake rupture occurs. A seismograph recording of earthquakes records its character and this information can be considered in combination with historic earthquakes on each possible causative fault in order to evaluate the most probable size and most probable type of earthquake that is likely to effect a given structure; [3] The recurrence interval of earthquakes on a given fault is an important factor that is preferably evaluated relative to probable effect on a given structure; [4] Building codes that govern design of structures and construction practices have changed significantly over the years since 1950. In general, requirements for strengthening against earthquakes and wind storms has increased with each new building code. Which building code under which a specific structure was designed and built is a very important factor when evaluating risk; [5] Wood frame, one to three story structures are considered generally to be most earthquake resistant. When an individual structure varies from this ideal, risk of damage also increases; [6] Shaking characteristics of an earthquake are maintained or modified by geologic structure and geologic materials. Certain geologic structures can reflect or deflect shaking energy. In general softer geologic materials increase the shaking amplitude while decreasing its frequency thereby causing more violent shaking of structures which increases the risk to damage. [7] Damage to a specific structure can also be estimated by empirical comparison to how similar structures performed in shaking or wind events in the past.

A probabilistic software engine program 30 therefore utilizes the above parameters and evaluates the likelihood of various types of damage occurring and the probable monetary value (cost) of the likely damage for a given set of conditions. In these type of probabilistic calculations, accuracy improves significantly when a large number of individual properties are evaluated in this way. Accordingly, the present invention has an additional advantage in that the reliability of results obtained should improve with time. It can be see also that the inclusion of detailed site specific information results in a higher degree of reliability of probability quantifications than is attained than that allowed by group portfolio analyses alone.

Geologic/seismic database 33 (and/or wind force database 36) information and structural data 20 retrieved from the onsite inspection are combined by probability calculation program 30 for a given structure. Structural data 20 collected serves to define parameters of the structural design as it modifies probabilistic analysis of the structure. The physical disturbance database (geologic/seismic and/or wind force) information serves to define parameters of the likely stresses, empirical failure rates and the geographic and demographic characteristics for a given structure. It will be appreciated by those skilled in the art that other programs 30 can be substituted to perform the above analysis, subject only to the constraint that they be capable of correlating structural data 20 collected at the onsite inspection, with a preexisting geologic database 33 and/or wind database 36 (which also include geographic, demographic and regulatory information as noted above).

After the analysis is completed, a report 40 is generated. Report 40 can include a rating indicating whether the structure has a high or low probability of damage due to the stresses expected. An unfavorable, or low rating can be given to a structure which is given a higher probability of damage due to expected stress characteristics. Report 40 also fully describes the findings and reasons for any given rating.

The rating and report can be used for actuarial purposes by insurance carriers. For example, such carriers may decide to give structures getting a favorable rating much lower insurance rates. The report also includes information on the defects and flaws in such structure, and how to strengthen such structures against damage causing events. Many structures that initially obtain an unfavorable rating can undergo a retrofitting step 50 to permit an optional re-inspection as shown in FIG. 1. This mechanism provides residential homeowners with incentives to strengthen their homes because a higher rating may be obtained from a subsequent re-evaluation.

Furthermore, it is apparent that after a structure has been inspected once, and retrofitting has been done to such structure, the necessity and cost of another complete actual on-site inspection can usually be avoided. Thus, only the retrofitting portions of the inspection would be repeated if it appears that there is no reasonable basis for concluding that (other than the retrofitting) substantial changes need to be made in the original collected structural data. If the original collected structural data is preserved in permanent electronic form usable by program 40, the necessity for another complete onsite inspection can even be avoided.

One beneficial consequence of using the present invention therefore is a structurally upgraded and more sound housing stock. In all cases, regardless of retrofitting or insurance eventualities, homeowners are made aware of the risk level of their home being damaged by earthquake shaking or wind forces. Home buyers, Realtors, lending institutions and other organizations interested in the potential risk of damage to a specific structure also can benefit from increased reliability and certainty provided by the present invention. The precise substance and format of report 40 can be tailored to fit specific needs of any particular market segment or audience.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the appended claims.

What is claimed is:

1. A method for estimating risk of damage likely to be sustained by a structure located at a particular site from a physical disturbance, said method including the steps of:

inspecting said structure at said site to determine its structural characteristics; and collecting structure data pertaining to the structural characteristics of said structure; and inputting the structure data in a format usable by a computer; and generating an estimate of risk of damage to said structure, wherein the estimate is generated by a computer program based on a combination of the structure data and physical disturbance related information for said site; wherein the computer program includes a probabilistic software engine, and said probabilistic software engine analyzes and combines the structural characteristics data with seismic related databases to generate a rating for said structure.

2. The method of claim 1, wherein the seismic databases include information pertaining to earthquake faults in the vicinity of said site, probable type and size of earthquakes in the vicinity of said site, earthquake recurrences in the vicinity of said site, and geologic conditions of said site.

3. The method of claim 2, wherein the seismic related information for said site is derived from one or more databases such as USQUAKE.

4. The method of claim 1, wherein the structural characteristics data includes data relating to frame characteristics, wall characteristics, foundation characteristics, cripple wall characteristics, roof characteristics and soft story characteristics.

5. The method of claim 1, further including the step of collecting building code data and empirical damage historical data for such structure to be used by the computer program to generate the risk estimate.

6. The method of claim 1, wherein the risk estimate includes information pertaining to the likelihood of said physical disturbance occurring, potential damage likely to be caused by said disturbance, and probable financial harm resulting from such damage.

7. The method of claim 6, wherein the risk estimate further includes an acceptable or unacceptable rating for such structure, and such rating can be used for actuarial purposes for such structure.

8. The method of claim 1, wherein the computer program further generates a report having information on defects in said structure, and recommendations for curing such defects.

9. A method for estimating risk of damage likely to be sustained by a structure located at a particular site from a physical disturbance, said method including the steps of:

inspecting said structure at said site to determine its structural characteristics; and collecting structure data pertaining to the structural characteristics of said structure; and inputting the structure data in a format usable by a computer; and generating an estimate of risk of damage to said structure, wherein the estimate is generated by a computer program based on a combination of the structure data and physical disturbance related information for said site; wherein the computer program includes a probabilistic software engine, and said probabilistic software engine analyzes and combines the structural characteristics data with wind force related databases to generate a rating for said structure.

10. The method of claim 9, wherein the wind force related information for said site is derived from one or more databases such as USWIND.

11. The method of claim 9, wherein the structural characteristics data includes data relating to frame characteristics, wall characteristics, foundation characteristics, cripple wall characteristics, roof characteristics and soft story characteristics.

12. The method of claim 9, further including the step of collecting building code data and empirical damage historical data for such structure to be used by the computer program to generate the risk estimate.

13. The method of claim 9, wherein the risk estimate includes information pertaining to the likelihood of said physical disturbance occurring, potential damage likely to be caused by said disturbance, and probable financial harm resulting from such damage.

14. The method of claim 13, wherein the risk estimate further includes an acceptable or unacceptable rating for such structure, and such rating can be used for actuarial purposes for such structure.

15. The method of claim 9, wherein the computer program further generates a report having information on defects in said structure, and recommendations for curing such defects.

16. A method for estimating risk of damage likely to be sustained by a structure located at a particular site from a physical disturbance, said method including the steps of:

inspecting said structure at said site to determine its structural characteristics; and collecting structure data pertaining to the structural characteristics of said structure; and inputting the structure data in a format usable by a computer; and generating an estimate of risk of damage to said structure, wherein the estimate is generated by a computer program based on a combination of the structure data and physical disturbance related information for said site;

wherein the risk estimate includes information pertaining to the likelihood of said physical disturbance occurring, potential damage likely to be caused by said disturbance, and probable financial harm resulting from such damage;

wherein the risk estimate further includes an acceptable or unacceptable rating for such structure, and such rating can be used for actuarial purposes for such structure.

17. The method of claim 16, wherein the structural characteristics data includes data relating to frame characteristics, wall characteristics, foundation characteristics, cripple wall characteristics, roof characteristics and soft story characteristics.

18. The method of claim 16, further including the step of collecting building code data and empirical damage historical data for such structure to be used by the computer program to generate the risk estimate.

19. The method of claim 16, wherein the computer program includes a probabilistic software engine, and said probabilistic software engine analyzes and combines the structural characteristics data with seismic related databases to generate the rating for said structure.

20. The method of claim 19, wherein the seismic databases include information pertaining to earthquake faults in the vicinity of said site, probable type and size of earthquakes in the vicinity of said site, earthquake recurrences in the vicinity of said site, and geologic conditions of said site.

21. The method of claim 20, wherein the seismic related information for said site is derived from one or more databases such as USQUAKE.

22. The method of claim 16, wherein the computer program includes a probabilistic software engine, and said probabilistic software engine analyzes and combines the structural characteristics data with wind force related databases to generate the rating for said structure.

23. The method of claim 22, wherein the wind force related information for said site is derived from one or more databases such as USWIND.

24. The method of claim 16, wherein the computer program further generates a report having information on defects in said structure, and recommendations for curing such defects.

25. The method of claim 16, wherein said structure is a residential wood frame structure inspected onsite by a visual examination.

26. A method for estimating risk of damage likely to be sustained by a structure located at a particular site from a physical disturbance, said method including the steps of:

inspecting said structure at said site to determine its structural characteristics; and collecting structure data pertaining to the structural characteristics of said structure; and inputting the structure data in a format usable by a computer; and generating an estimate of risk of damage to said structure, wherein the estimate is generated by a computer program based on a combination of the structure data and physical disturbance related information for said site;

wherein said structure is a residential wood frame structure inspected onsite by a visual examination.

27. The method of claim 26, wherein the structural characteristics data includes data relating to frame characteristics, wall characteristics, foundation characteristics, cripple wall characteristics, roof characteristics and soft story characteristics.

28. The method of claim 26, further including the step of collecting building code data and empirical damage historical data for such structure to be used by the computer program to generate the risk estimate.

29. The method of claim 26, wherein the computer program includes a probabilistic software engine, and said probabilistic software engine analyzes and combines the structural characteristics data with seismic related databases to generate a rating for said structure.

30. The method of claim 29, wherein the seismic databases include information pertaining to earthquake faults in the vicinity of said site, probable type and size of earthquakes in the vicinity of said site, earthquake recurrences in the vicinity of said site, and geologic conditions of said site.

31. The method of claim 30, wherein the seismic related information for said site is derived from one or more databases such as USQUAKE.

32. The method of claim 26, wherein the computer program includes a probabilistic software engine, and said probabilistic software engine analyzes and combines the structural characteristics data with wind force related databases to generate a rating for said structure.

33. The method of claim 32, wherein the wind force related information for said site is derived from one or more databases such as USWIND.

34. The method of claim 26, wherein the risk estimate includes information pertaining to the likelihood of said physical disturbance occurring, potential damage likely to be caused by said disturbance, and probable financial harm resulting from such damage.

35. The method of claim 34, wherein the risk estimate further includes an acceptable or unacceptable rating for such structure, and such rating can be used for actuarial purposes for such structure.

36. The method of claim 26, wherein the computer program further generates a report having information on defects in said structure, and recommendations for curing such defects.

37. A method for estimating risk of damage to a wood frame structure at a particular site from potential earthquake forces, said method including the steps of:

inspecting said wood frame structure at said site to determine its structural characteristics; and collecting data related to the structural characteristics of said structure, including frame, supporting wall, foundation, cripple wall and roof characteristics;

generating a structural characteristics database from the structural characteristics data; and generating an estimate of likely damage to said structure, wherein the estimate is calculated by a computer program based on a combination of the structural characteristics database for said structure and seismic database information for said site;

wherein the computer program includes a probabilistic software engine, and said probabilistic software engine analyzes and combines the structural characteristics database with seismic related databases to generate a rating for said structure.

38. The method of claim 37, wherein the seismic databases include information pertaining to earthquake faults in the vicinity of said site, probable type and size of earthquakes in the vicinity of said site, earthquake recurrences in the vicinity of said site, and geologic conditions of said site.

39. The method of claim 37, wherein the seismic related information for said site is derived from one or more databases such as USQUAKE.

40. The method of claim 37, wherein the structural characteristics data includes data relating to frame characteristics, wall characteristics, foundation characteristics, cripple wall characteristics, roof characteristics and soft story characteristics.

41. The method of claim 37, further including the step of collecting building code data and empirical damage historical data for such structure to be used by the computer program to generate the risk estimate.

42. The method of claim 37, wherein the risk estimate includes information pertaining to the likelihood of said physical disturbance occurring, potential damage likely to be caused by said disturbance, and probable financial harm resulting from such damage.

43. The method of claim 42, wherein the risk estimate further includes an acceptable or unacceptable rating for such structure, and such rating can be used for actuarial purposes for such structure.

44. The method of claim 37, wherein the computer program further generates a report having information on defects in said structure, and recommendations for curing such defects.

45. The method of claim 37, wherein said structure is a residential wood frame structure inspected onsite by a visual examination.

46. A method for estimating risk of damage to a wood frame structure at a particular site from potential wind forces, said method including the steps of:

inspecting said wood frame structure at said site to determine its structural characteristics; and collecting data related to the structural characteristics of said structure, including window, frame, supporting wall, foundation, cripple wall and roof characteristics;

generating a structural characteristics database from the structural characteristics data; and generating an estimate of likely damage to said structure, wherein the estimate is calculated by a computer program based on a combination of the structural characteristics database for said structure and wind force database information for said site;

wherein the computer program includes a probabilistic engine, and said probabilistic engine analyzes and combines the structural characteristics data with wind force related databases to generate a rating for said structure.

47. The method of claim 46, wherein the wind force databases include information pertaining to probable type and intensity of wind forces in the vicinity of said site, wind force recurrences in the vicinity of said site, and wind force exposure of said site.

48. The method of claim 46, wherein the wind force related information for said site is derived from one or more databases such as USWIND.

49. The method of claim 46, wherein the structural characteristics data includes data relating to frame characteristics, wall characteristics, foundation characteristics, cripple wall characteristics, roof characteristics and soft story characteristics.

50. The method of claim 46, further including the step of collecting building code data and empirical damage historical data fore such structure to be used by the computer program to generate the risk estimate.

51. The method of claim 46, wherein the risk estimate includes information pertaining to the likelihood of said physical disturbance occurring, potential damage likely to be caused by said disturbance, and probable financial harm resulting from such damage.

52. The method of claim 51, wherein the risk estimate further includes an acceptable or unacceptable rating for such structure, and such rating can be used for actuarial purposes for such structure.

53. The method of claim 46, wherein the computer program further generates a report having information on defects in said structure, and recommendations for curing such defects.

54. The method of claim 46, wherein said structure is a residential wood frame structure inspected onsite by a visual examination.

* * * * *